(12) United States Patent
Shiraishi et al.

(10) Patent No.: US 9,133,277 B2
(45) Date of Patent: Sep. 15, 2015

(54) METHOD FOR SOLUBILIZING CELLULOSE

(75) Inventors: Koichi Shiraishi, Sapporo (JP); Tohru Joboji, Sapporo (JP); Kento Taneda, Yokohama (JP)

(73) Assignee: KABUSHIKI KAISHA EQUOS RESEARCH, Tokyo (JP)

( * ) Notice: Subject to any disclaimer, the term of this patent is extended or adjusted under 35 U.S.C. 154(b) by 43 days.

(21) Appl. No.: 14/112,378

(22) PCT Filed: Apr. 2, 2012

(86) PCT No.: PCT/JP2012/058935
§ 371 (c)(1),
(2), (4) Date: Dec. 3, 2013

(87) PCT Pub. No.: WO2012/147460
PCT Pub. Date: Nov. 1, 2012

(65) Prior Publication Data
US 2014/0081013 A1    Mar. 20, 2014

(30) Foreign Application Priority Data

Apr. 28, 2011  (JP) .................................. 2011-100462
Jun. 29, 2011  (JP) .................................. 2011-144953

(51) Int. Cl.
*C08B 1/00*    (2006.01)
*C13K 1/02*   (2006.01)

(52) U.S. Cl.
CPC ... *C08B 1/00* (2013.01); *C13K 1/02* (2013.01); *A23V 2002/00* (2013.01)

(58) Field of Classification Search
None
See application file for complete search history.

(56) References Cited

U.S. PATENT DOCUMENTS

2008/0241536 A1   10/2008   Luo et al.

FOREIGN PATENT DOCUMENTS

| JP | 62-236801 A | 10/1987 |
|----|-------------|---------|
| JP | A 2007-54688 | 3/2007 |
| JP | A 2008-248466 | 10/2008 |
| JP | A 2009-77697 | 4/2009 |
| JP | A 2010-46565 | 3/2010 |
| JP | A 2010-166831 | 8/2010 |
| JP | A 2010-279255 | 12/2010 |

OTHER PUBLICATIONS

Horvath, J. Phys. Chem. Ref. Data, vol. 35, No. 1, 2006.*
Millett, Advances in Chemistry, vol. 181, Chapter 4: Influence of Fine Grinding on the Hydrolysis of Cellulosic Materials—Acid Vs. Enzymatic, pp. 71-89, American Chemical Society, 1979.*
Kumagai et al; "Characteristics of Hydrothermal Decomposition and Saccharification of Various Lignocellulosic Biomass and Enzymatic Saccharification of the Obtained Hydrothermal-Residue;" Journal of the Japan Institute of Energy; 2007; vol. 86; pp. 712-717 (with English-language abstract).
Jun. 12, 2012 Search Report issued in International Patent Application No. PCT/JP2012/058935 (with translation).
Jun. 7, 2013 International Preliminary Report on Patentability issued in International Patent Application No. PCT/JP2012/058935 (with translation).
Mar. 3, 2015 Office Action issued in Japanese Application No. 2011-144953.

* cited by examiner

*Primary Examiner* — Layla Bland
(74) *Attorney, Agent, or Firm* — Oliff PLC

(57) ABSTRACT

Provided is a method for solubilizing cellulose in which cellulose can be solubilized in a short period of time with a low amount of excess decomposition and without the use of a catalyst or other chemicals. A starting material containing cellulose is pulverized to reduce the crystallization thereof, adjusted for moisture content, reacted with water in the absence of a catalyst, and converted into a water-soluble component. At this point, the reaction is performed at a temperature of 100° C. or more and less than 300° C., and a total pressure of 0.05 MPa or more and less than 10 MPa. Water is added and extracted from the water soluble component, and solid-liquid separation is performed to separate the solids and the aqueous solution.

6 Claims, 7 Drawing Sheets

METHOD FOR SOLUBILIZING CELLULOSE

TECHNICAL FIELD

The present invention relates to a method for solubilizing cellulose in which a raw material containing cellulose is reacted with water for conversion into a water soluble component under conditions in which a catalyst is not present.

BACKGROUND ART

Recently, biofuels gain attention as an alternative fuel to petroleum. Thus, commercial production of bioethanol using biomass such as sugar cane or corn is carried out. However, when food sources are used as a raw material of bioethanol, a problem occurs in that the prices fluctuate greatly due to a competition with the food sources. For such reasons, it is desired to produce biofuels by using cellulose-based biomass as non-food sources including tree, grass, rice straw, or the like.

Meanwhile, it is not easy to hydrolyze tough cellulose into sugar. Although a method of saccharifying cellulose using a strong liquid acid such as sulfuric acid is conventionally known, there are problems that an apparatus is corroded by the strong acid, gypsum or the like is generated in a large amount as a waste when a strong acid is treated for neutralization, or the like, and thus the method has not been put into practical use.

To solve those problems, a hydrothermal treatment for converting cellulose into water soluble polysaccharides with a low molecular weight using pressurized hot water but without using any catalyst gains attention (for example, Patent Documents 1 and 2). For the hydrothermal treatment, "pressurized hot water" is used. The pressurized hot water indicates water present in a liquid state at a high temperature and high pressure according to pressurization to the saturated vapor pressure or higher. It is believed that, as ionic product is increased, the pressurized hot water can promote the hydrolysis reaction of cellulose (see, paragraph [0024] of Patent Document 1). Accordingly, the hydrothermal treatment has an advantage that a cellulose raw material can be solubilized in a short period of time without using a specific chemical, and thus it can be said that it is a method for solubilizing a cellulose raw material having little load on an environment.

A method for chemical decomposition of cellulose is disclosed in Patent Document 3.

CITATION LIST

Patent Document

Patent Document 1: JP 2010-166831 A
Patent Document 2: JP 2010-279255 A
Patent Document 3: JP 2008-248466 A

DISCLOSURE OF THE INVENTION

Problem to be Solved by the Invention

However, according to the cellulose solubilization based on the hydrothermal treatment of a related art, there is a problem that, due to further reaction of solubles, an excessively decomposed product such as lactic acid, acetic acid, or hydroxymethylfurfural (HMF) are generated in a large amount.

The present invention is achieved under the circumstance described above, and an object of the present invention is to provide a method for solubilizing cellulose in a short period of time without using a chemical such as a catalyst and producing a small amount of excessively decomposed product.

Means for Solving Problem

To solve the problems, inventors of the present invention investigated again the reaction condition for hydrolysis of cellulose with water. According to principles of hydrothermal treatment of a related art, boiling point of water is increased by increasing a total pressure so as to have pressurized hot water which maintains a liquid state even at a high temperature of 100° C. or higher. As described above, it is considered that, as ionic product of water increases at a high temperature (the maximum is exhibited at near 250 to 300° C.) to yield higher concentration of hydrogen ion or hydroxide ion, the hydrolysis reaction of cellulose is promoted. For such reasons, carrying out the reaction at a high temperature of 100° C. or higher and also under conditions in which pressurized hot water can be present in a liquid state after increasing the boiling temperature of water by increasing a total pressure corresponds to common knowledge of a person skilled in the art.

However, the inventors of the present invention found a surprising fact that, even in a high temperature and low pressure region in which a total pressure is lower than the saturated vapor pressure (i.e., a condition allowing boiling of water) and pressurized hot water cannot be present (i.e., water cannot maintain a liquid state), there is a region in which hydrolysis of cellulose is promoted. It was also found that the hydrolysis reaction of cellulose in the newly found high temperature and low pressure region can exhibit an advantageous effect that an excessively decomposed product such as lactic acid, acetic acid, or hydroxymethylfurfural (HMF) is extremely little, and thus the present invention was completed accordingly.

That is, a first aspect of the cellulose solubilization method of the present invention is a method for solubilizing cellulose in which cellulose is converted into a water soluble component by reacting a raw material containing cellulose with water under conditions in which a catalyst is not present, which is characterized in that the reaction is performed under conditions with a temperature of 100° C. or higher and lower than 300° C. and a total pressure of 0.05 MPa or higher and lower than 10 MPa.

The hydrolysis reaction of cellulose is slowed if the reaction is performed at lower than 100° C., and it takes time to have the solubilization. On the other hand, when the reaction is performed at higher than 300° C., an excessively decomposed product may be produced in a large amount. More preferred reaction temperature is 150° C. or higher and lower than 270° C., and most preferred reaction temperature is 170° C. or higher and lower than 250° C.

Further, if the total pressure is less than 0.05 MPa, boiling point of water is lowered so that the temperature cannot be increased to a high level, and also as the hydrolysis reaction of cellulose is slowed, it takes time to have the solubilization. On the other hand, when the total pressure is higher than 10 MPa, an excessively decomposed product may be produced in a large amount. More preferred total pressure is 0.1 MPa or higher and lower than 5 MPa, and most preferred total pressure is 0.15 MPa or higher and lower than 3 MPa.

According to a second aspect of the cellulose solubilization method of the present invention, the total pressure is lower than the saturated vapor pressure and water is entirely in a gas state.

As the total pressure is lower than saturated vapor pressure, water is in a boiling state so that it quickly becomes gas (i.e., water vapor) and water cannot be stably present in a liquid state. Thus, according to the hydrolysis reaction of cellulose of the second aspect, cellulose is reacted with water in a gas state, which is completely different from a hydrolysis reaction using pressurized hot water of a related art. According to the test results of the inventors, there are advantages that the hydrolysis reaction of cellulose progresses quickly even under such a reaction condition and an excessively decomposed product such as lactic acid, acetic acid, or hydroxymethylfurfural (HMF) is produced in a very small amount.

Further, according to a third aspect of the cellulose solubilization method of the present invention, each of a raw material containing cellulose and water is added in a pre-determined amount to a reaction vessel, and temperature and pressure are adjusted by heating after sealing the reaction vessel.

According to this cellulose solubilization method, by heating after sealing the reaction vessel, water vapor pressure for a case in which whole water has been evaporated into water vapor can be easily obtained by calculation based on the volume of the reaction vessel and the amount of water. Thus, only by defining the reaction temperature, it is easy to have pre-determined pressure. Thus, the reaction apparatus is simplified and also facility-related cost can be lowered.

Further, according to a fourth aspect of the cellulose solubilization method of the present invention, a value of (weight of water/weight of cellulose) is 0.01 or more and less than 7.

According to the test results of the inventors of the present invention, when the (weight of water/weight of cellulose) is more than 7, the occurrence ratio of an excessively decomposed product increases. On the other hand, when the (weight of water/weight of cellulose) is less than 0.01, the amount of water required for the hydrolysis reaction is small so that the yield of water solubilized product may be lowered. More preferably, the value of (weight of water/weight of cellulose) is 0.01 or more and less than 1.2, and most preferably 0.03 or more and less than 0.3.

Further, according to a fifth aspect of the cellulose solubilization method of the present invention, value of (weight of water)/(weight of cellulose+weight of water) is 0.01 or more and less than 0.87.

According to the test results of the inventors of the present invention, when the (weight of water)/(weight of cellulose+weight of water) is more than 0.87, the occurrence ratio of an excessively decomposed product increases. On the other hand, when the (weight of water)/(weight of cellulose+weight of water) is less than 0.01, the amount of water required for the hydrolysis reaction is small so that the yield of water solubilized product may be lowered. More preferably, the value of (weight of water)/(weight of cellulose+weight of water) is 0.01 or more and less than 0.55, and most preferably 0.03 or more and less than 0.23.

Still further, according to a sixth aspect of the cellulose solubilization method of the present invention, a solubilization treatment is performed after reducing the crystallization degree of a raw material containing cellulose.

As described herein, the crystallization degree indicates the ratio of crystallized portion in a raw material, and it is specified by Segal method based on an X ray diffraction measurement or the like.

As a method for reducing the crystallization degree of cellulose, a physical method such as pulverization (see, a seventh aspect) or a chemical method using an ionic liquid can be exemplified.

BEST MODE(S) FOR CARRYING OUT THE INVENTION

Figure 1:
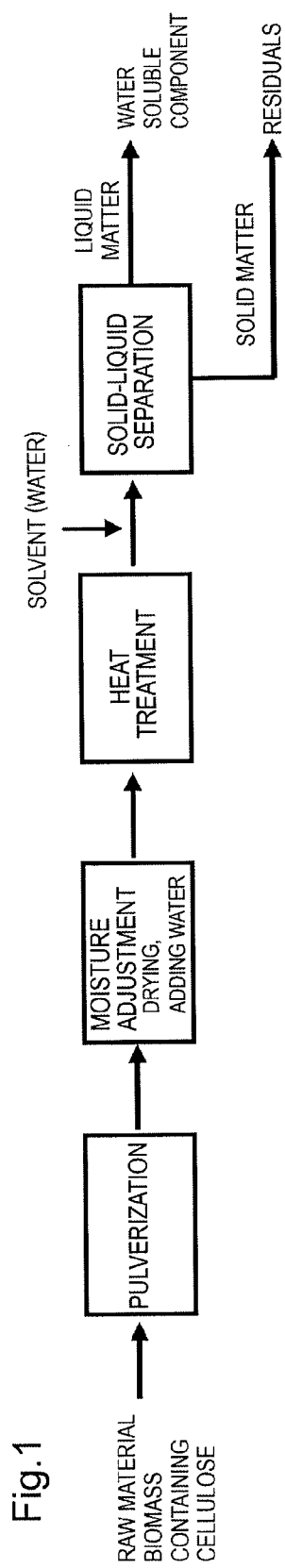
FIG. 1 is a flow diagram illustrating the method for solubilizing cellulose.

According to an embodiment of the cellulose solubilization method of the present invention, the heat treatment is carried out after the crystallization degree of a raw material containing cellulose is reduced and moisture content is adjusted as illustrated in FIG. 1. Then, the water solubilized raw material as a result of hydrolysis by the heat treatment is extracted by adding water and subjected to a solid-liquid separation for separation into a solid component and a liquid component. Hereinafter, each process will be described in detail.

(Raw Material)

The raw material containing cellulose indicates a plant-based raw material containing cellulose, and in addition to cellulose, any of those containing polysaccharides other than cellulose such as starch, hemicellulose, or pectin may be used. Specific examples thereof include grasses such as rice straw, barely straw, or burgess, thinned logs such as bamboo or sasa borealis, processed wood products such as saw dust, chip, or short log, wood-based biomass such as trimmed branches of street trees, constructional wood waste, wood bark, or driftwood, and biomass from a cellulose product such as used paper. Further, as long as cellulose is contained to the extent that it can be used as a raw material, it is possible to use slime, animal waste, agricultural waste, city waste, or the like.

(Treatment for Reducing Crystallization Degree)

In order to promote the solubilization of cellulose, the raw material is preferably subjected to pulverization as a pre-treatment to reduce the crystallization degree of cellulose. Method for reducing the crystallization degree of cellulose is not particularly limited, and pulverization as a physical method can be adopted, for example. A specific method for pulverization can be suitably selected depending on shape of raw material. When coarse pulverization to several to several tens of millimeters (mm) or so is carried out first to have an easily handleable state followed by further pulverization, micro pulverization can be efficiently performed. For coarse pulverization, a universal pulverizer such as a hammer mill or a cutter mill can be used. Further, for micro pulverization, a universal pulverizer such as a vibration mill, a ball mill, a rod mill, a roller mill, a colloid mill, a disc mill, or a jet mill can be used. As for the micro pulverization, any one of a dry mode and a wet mode can be used. However, from the viewpoint of reducing the crystallization degree of cellulose, dry pulverization is preferable. When water content is large in the raw material, by performing dry pulverization after reducing in advance the water content to 30% or less by centrifugal dehydration or hot air drying, the crystallization degree of cellulose can be efficiently reduced.

Other than those, the crystallization degree can be also reduced by dissolving cellulose using an ionic liquid (see, Patent Document 3).

(Moisture Adjustment and Heat Treatment)

Figure 2:
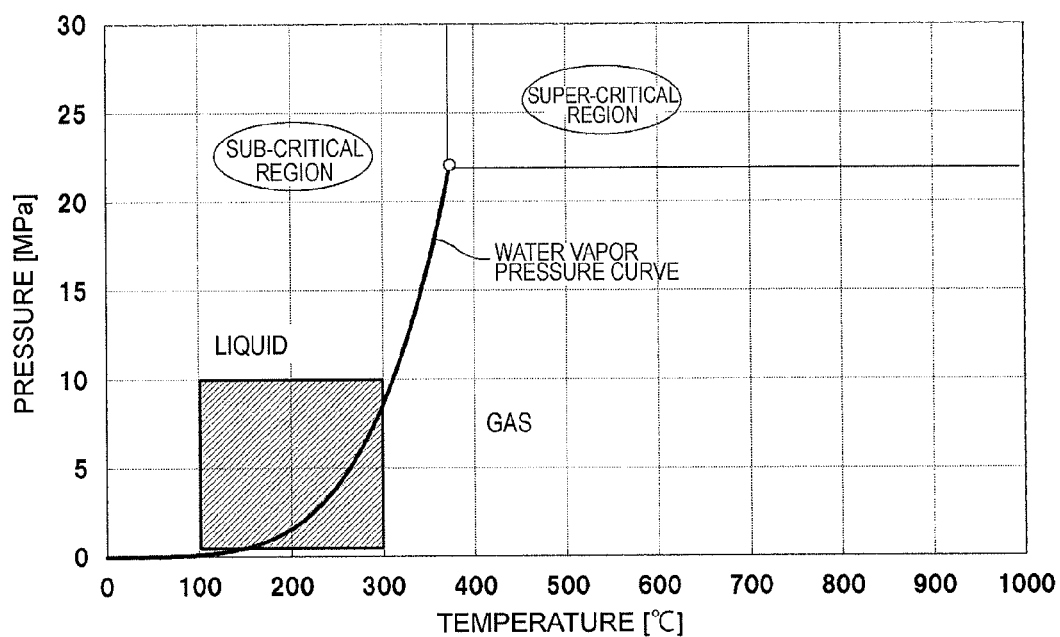
FIG. 2 is a phase diagram of water.

According to the cellulose solubilization method of the present invention, a temperature-pressure region that is completely different from a conventionally used temperature-pressure region is used. That is, according to a pressurized hot water method of a related art, the treatment is performed in a sub-critical region or a super-critical region shown in FIG. 2. The sub-critical region is a region in which the total pressure is higher than saturated vapor pressure. In other words, water is stably is present not only as water vapor but also as liquid water. For such reasons, it is assumed that the hydrolysis reaction of cellulose in the sub-critical region is driven by liquid water having increased ionic product. Further, the hydrolysis reaction of cellulose in the super-critical region is a hydrolysis reaction of water in a special state, that is, a super-critical state in which a differentiation between gas and liquid is impossible.

In this regard, the cellulose solubilization method of the present invention is characterized in that the hydrolysis reaction is carried out in a high temperature-low pressure region in which the temperature is 100° C. or higher and lower than 300° C. and the total pressure is 0.05 MPa or higher and lower than 10 MPa. Such region is expressed as a shaded area in FIG. 2, and it corresponds to a region in which the total pressure is lower than the saturated vapor pressure (i.e., water is not stably present and only water vapor is present) or a region in which liquid water and water vapor are co-present but the total pressure is less than 10 MPa, and therefore it represents a completely different state from the sub-critical region or super-critical region. Due to such difference, the cellulose solubilization method of the present invention can have a characteristic that an excessively decomposed product such as lactic acid, acetic acid, or hydroxymethylfurfural (HMF) is produced in a very small amount.

As the hydrolysis reaction is performed in such a high temperature-low pressure region, a sealed vessel attached with a lid may be used as a reaction vessel. As for the vessel, an autoclave device made of anti-corrosive metal or a vessel with dual structure in which a vessel attached with a lid made of fluororesin such as PTFE is installed on an inner side of a metallic pressure-resistant vessel can be used.

Further, a raw material containing cellulose and water are added in a predetermined amount to the vessel. After covering with the lid, the temperature is set to a predetermined temperature of 100° C. or higher and lower than 300° C. Accordingly, moisture originally contained in the raw material and added water turn into water vapor, causing higher volume. The final pressure yielded at that time can be easily obtained by incorporating the temperature, amount of water, and vessel volume to a state equation calibrated against real gas. The heating method is not particularly limited, and an electric heater, high frequency wave, steam, or the like can be used.

(Extraction of Water Solubilized Product)

By extracting the water solubilized product as produced above with water, an extract liquid of water solubilized product can be obtained. The extract liquid of water solubilized product as obtained above contains polysaccharides with a low molecular weight such as oligosaccharides and glucose as a main component. Although an excessively decomposed product such as lactic acid, acetic acid, or hydroxymethylfurfural (HMF) is also produced at that time, its ratio is significantly smaller than the aforementioned hydrothermal method.

(Solid-Liquid Separation)

The extract liquid of water solubilized product obtained from above also contains insoluble materials that are not soluble in water. As such, water is added in an amount such that it is 0.1 to 500 times the reaction liquid and then solid-liquid separation is performed using an apparatus for solid-liquid separation. Examples of the apparatus for solid-liquid separation include apparatuses adopting a gravity precipitation mode, a centrifugal separation mode, a membrane separation mode, an aggregation separation mode, a floating separation mode, or the like.

EXAMPLES

Hereinbelow, the examples further elaborating the present invention are described.

Examples 1 to 7

In Examples 1 to 7, cellulose as a chemical reagent is used as a raw material to perform the solubilization reaction as described below.

Pulverization Step

As a raw material containing cellulose, cellulose as a chemical reagent (product name: Micro-Crystalline Cellulose, manufactured by Merck) was used and pulverized for 10 hours using a planetary ball mill (product name: Planetary Rotary Ball Mill, manufactured by Ito Seisakusho Co., Ltd.). Accordingly, the crystallization degree of the raw material is reduced.

Moisture Adjustment Step

Thus-obtained pulverized cellulose powder was weighed in an amount of 15 mg and added into a pressure resistant PTFE vessel with dual structure and attached with a lid (the inner side vessel is a PTFE vessel with volume of 28 cm$^3$ and the outer side vessel is a stainless vessel). After adding a predetermined amount of water (0 mg for Examples 1 to 3, 15 mg for Examples 4 and 5, or 100 mg for Examples 6 and 7), the vessel was covered with a lid.

Heat Treatment Step and Extraction Step

The pressure resistant PTFE vessel added with the sample was placed in an electric heater. After heating at 200° C. for a predetermined time, the content was extracted with 4.75 ml water and filtered using a filter to obtain a water extract liquid.

Comparative Examples 1 to 9

The water addition amount for the moisture adjustment step was as follows: 500 mg for Comparative Examples 1 to 3, 1500 mg for Comparative Examples 4 to 7, and 4750 mg for Comparative Examples 8 and 9. Other conditions are the same as those of Examples 1 to 7, and thus further explanations are omitted.

<Evaluation>

Figure 3:
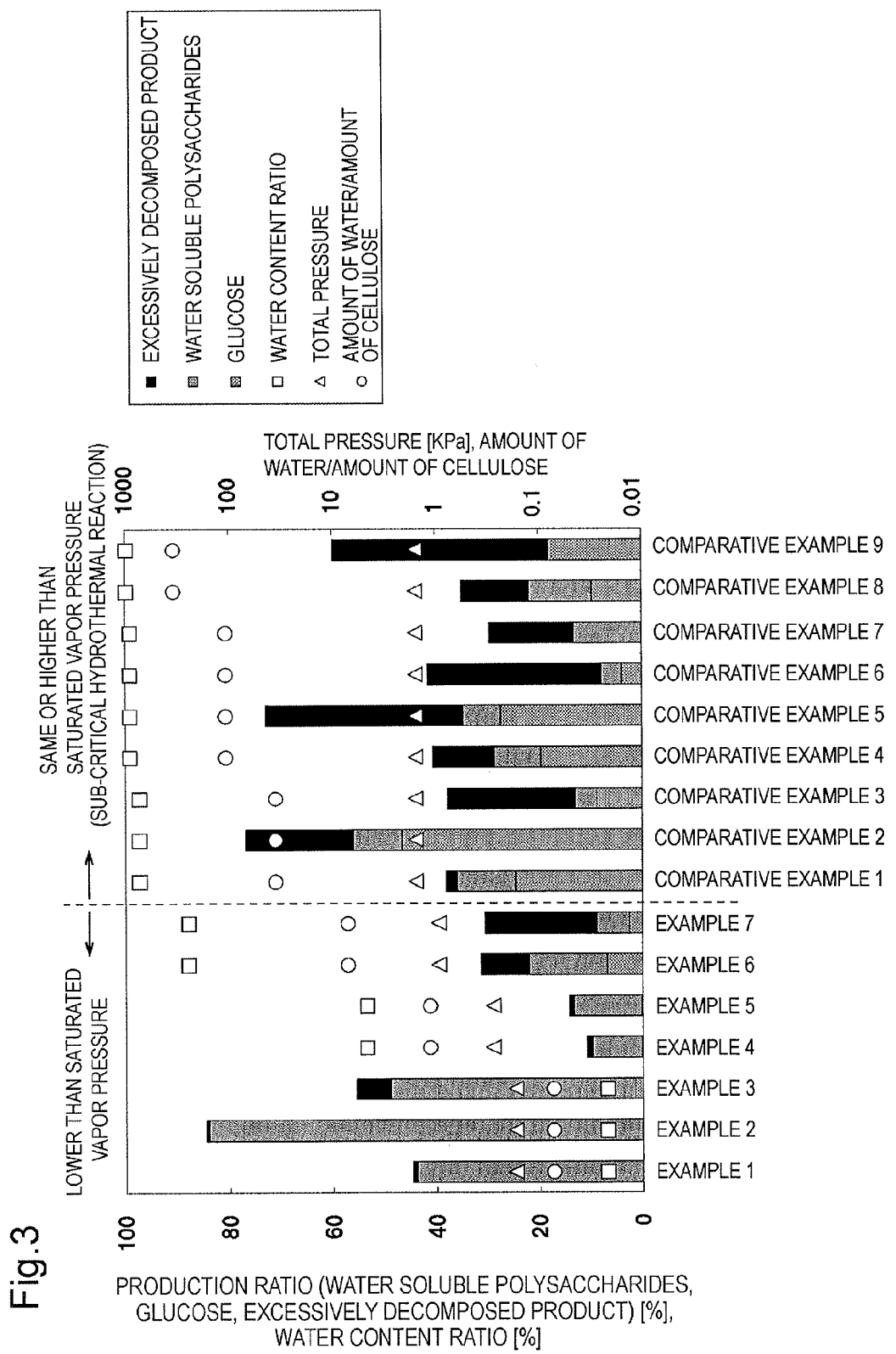
FIG. 3 is a graph illustrating the reaction conditions of Examples and Comparative Examples and the production ratio of various components.

Components and amount of the extract liquid of Examples 1 to 7 and Comparative Example 1 to 9 which have been obtained as described above were analyzed by high speed liquid chromatography and also the solubilization ratio was obtained from the measurement values based on total organic carbon system (TOC system). The results are shown in Table 1 and FIG. 3.

TABLE 1

| | Reaction conditions | | | | | | | Results of analysis | | | |
|---|---|---|---|---|---|---|---|---|---|---|---|
| | Water content in cellulose (mg) | Amount of added water (mg) | Temperature (° C.) | Reaction time hr | Moisture ratio | Water content ratio % | Total Pressure MPa | Partial pressure of water vapor MPa | Solubilization ratio % | Glucose % | Excessively decomposed product % | Water soluble polysaccharides % |
| Example 1 | 15 | 0 | 200 | 1 | 0.07 | 6.8 | 0.17 | 0.01 | 44.6 | 0.1 | 0.8 | 43.7 |
| Example 2 | 15 | 0 | 200 | 3 | 0.07 | 6.8 | 0.17 | 0.01 | 84.6 | 0.1 | 0.6 | 83.9 |
| Example 3 | 15 | 0 | 200 | 6 | 0.07 | 6.8 | 0.17 | 0.01 | 55.4 | 1.5 | 6.5 | 47.4 |
| Example 4 | 15 | 15 | 200 | 1 | 1.2 | 53.4 | 0.28 | 0.12 | 10.8 | 0.2 | 1.1 | 9.6 |
| Example 5 | 15 | 15 | 200 | 3 | 1.2 | 53.4 | 0.28 | 0.12 | 14.2 | 0.2 | 0.9 | 13.0 |
| Example 6 | 15 | 100 | 200 | 1 | 7.2 | 87.8 | 0.94 | 0.78 | 31.2 | 6.8 | 9.3 | 15.1 |
| Example 7 | 15 | 100 | 200 | 3 | 7.2 | 87.8 | 0.94 | 0.78 | 30.5 | 2.5 | 21.7 | 6.2 |
| Comp. example 1 | 15 | 500 | 200 | 0.5 | 36 | 97.3 | >1.56 | 1.56 | 37.9 | 24.5 | 2.1 | 11.3 |
| Comp. example 2 | 15 | 500 | 200 | 1 | 36 | 97.3 | >1.56 | 1.56 | 76.9 | 46.5 | 20.8 | 9.6 |
| Comp. example 3 | 15 | 500 | 200 | 3 | 36 | 97.3 | >1.56 | 1.56 | 37.7 | 8.7 | 24.8 | 4.2 |
| Comp. example 4 | 15 | 1500 | 200 | 1 | 107 | 99.1 | >1.56 | 1.56 | 40.4 | 19.6 | 11.8 | 9.1 |
| Comp. example 5 | 15 | 1500 | 200 | 3 | 107 | 99.1 | >1.56 | 1.56 | 73.0 | 27.3 | 38.4 | 7.3 |
| Comp. example 6 | 15 | 1500 | 200 | 6 | 107 | 99.1 | >1.56 | 1.56 | 41.4 | 3.8 | 33.6 | 4.0 |
| Comp. example 7 | 15 | 1500 | 200 | 24 | 107 | 99.1 | >1.56 | 1.56 | 29.5 | 0.0 | 16.4 | 13.1 |
| Comp. example 8 | 15 | 4750 | 200 | 1 | 340 | 99.7 | >1.56 | 1.56 | 34.9 | 9.5 | 13.1 | 12.3 |
| Comp. example 9 | 15 | 4750 | 200 | 3 | 340 | 99.7 | >1.56 | 1.56 | 59.9 | 18.0 | 41.9 | 0.0 |

Moisture ratio: (Total amount of water in reaction vessel)/(Weight of dry cellulose)
Water content ratio: (Total amount of water in reaction vessel)/(Weight of cellulose + water) × 100

Excessively decomposed product: Sum of organic acids and HMF based on HPLC Water soluble polysaccharides: Solubilization ratio—(Conversion ratio into glucose+Conversion ratio into excessively decomposed product)

As shown in Table 1, all of Examples 1 to 7 and Comparative Examples 1 to 9 have the reaction temperature of 200° C., and the saturated vapor pressure is 1.56 MPa at that time. Meanwhile, the total pressure in Examples 1 to 7 is in the range of 0.17 to 0.94 MPa as shown in Table 1 and FIG. 3, while the total pressure in Comparative Examples 1 to 9 is higher than the saturated vapor pressure of 1.56 MPa. Based on the results, it was found that the all the added water and moisture contained in cellulose turned into water vapor and water in a liquid state does not exist in Examples 1 to 7. On the other hand, in Comparative Examples 1 to 9, as the amount of added water is large so that liquid water and saturated water vapor are in an equilibrium state and a significant amount of the added water exists as water in a liquid state.

Further, based on comparison of Examples 1 to 7 and Comparative Examples 1 to 9 in terms of solubilization ratio and production ratio of glucose and excessively decomposed product, it was found that, in Examples 1 to 7 in which the total pressure is lower than the saturated vapor pressure, the ratio of the production ratio of glucose and excessively decomposed product relative to the solubilization ratio is significantly low and the ratio of water soluble polysaccharides that are represented by oligosaccharides or the like is high. In Examples 1 to 3 in which the vapor pressure is low, in particular, most of the water soluble components are water soluble polysaccharides and glucose or an excessively decomposed product is extremely little. It was found based on those results that, as a pre-step for collecting glucose, the treatment method of Examples 1 to 7 are highly preferred as a method for solubilization treatment of cellulose.

On the other hand, in Comparative Examples 1 to 9 in which the total pressure is higher than the saturated vapor pressure, the ratio of the production ratio of glucose and excessively decomposed product relative to the solubilization ratio is high so that it is not a preferred method for solubilization treatment of cellulose as a pre-step for collecting glucose. Because when glucose and an excessively decomposed product are produced in a large amount by a method for water solubilization treatment of cellulose as a pre-step and they are further treated in the presence of a solid acid catalyst, sulfuric acid, or the like, an excessively decomposed product is further generated from the glucose, yielding a higher amount of an excessively decomposed product.

Further, with regard to the value of (weight of water/weight of cellulose) (i.e., the moisture ratio in Table 1) in a reaction system, in Examples 1 to 7 in which the moisture ratio is 0.07 to 7.2, the production ratio of glucose and excessively decomposed product relative to the solubilization ratio is significantly low and the ratio of water soluble polysaccharides having a low molecular weight that are represented by oligosaccharides or the like is high. This result indicates a very favorable property of the method of solubilization treatment of cellulose as a pre-step for collecting glucose, which enables obtainment of a highly homogeneous raw material that is rich in water soluble polysaccharides.

On the other hand, in Comparative Examples 1 to 9, the production ratio of glucose and excessively decomposed product relative to the solubilization ratio is high and glucose and an excessively decomposed product are produced in a large amount other than water soluble polysaccharides, and thus it is not preferred method of solubilization treatment of cellulose as a pre-step for collecting glucose.

Further, with regard to the value of (weight of water)/(weight of cellulose+weight of water) in a reaction system which is expressed in percentage (i.e., the water content in Table 2), in Examples 1 to 7 in which the water content is 6.8 to 87.8% by weight, the production ratio of glucose and excessively decomposed product relative to the solubilization ratio is significantly low and the ratio of water soluble polysaccharides that are represented by oligosaccharides or the like is high. On the other hand, in Comparative Examples 1 to 9 in which the water content is 97.3% by weight or more, the production ratio of glucose and excessively decomposed product relative to the solubilization ratio is high so that glucose and an excessively decomposed product are produced in a large amount other than water soluble polysaccharides, and thus it is not a preferred method of solubilization treatment of cellulose as a pre-step for collecting glucose.

Figure 4:
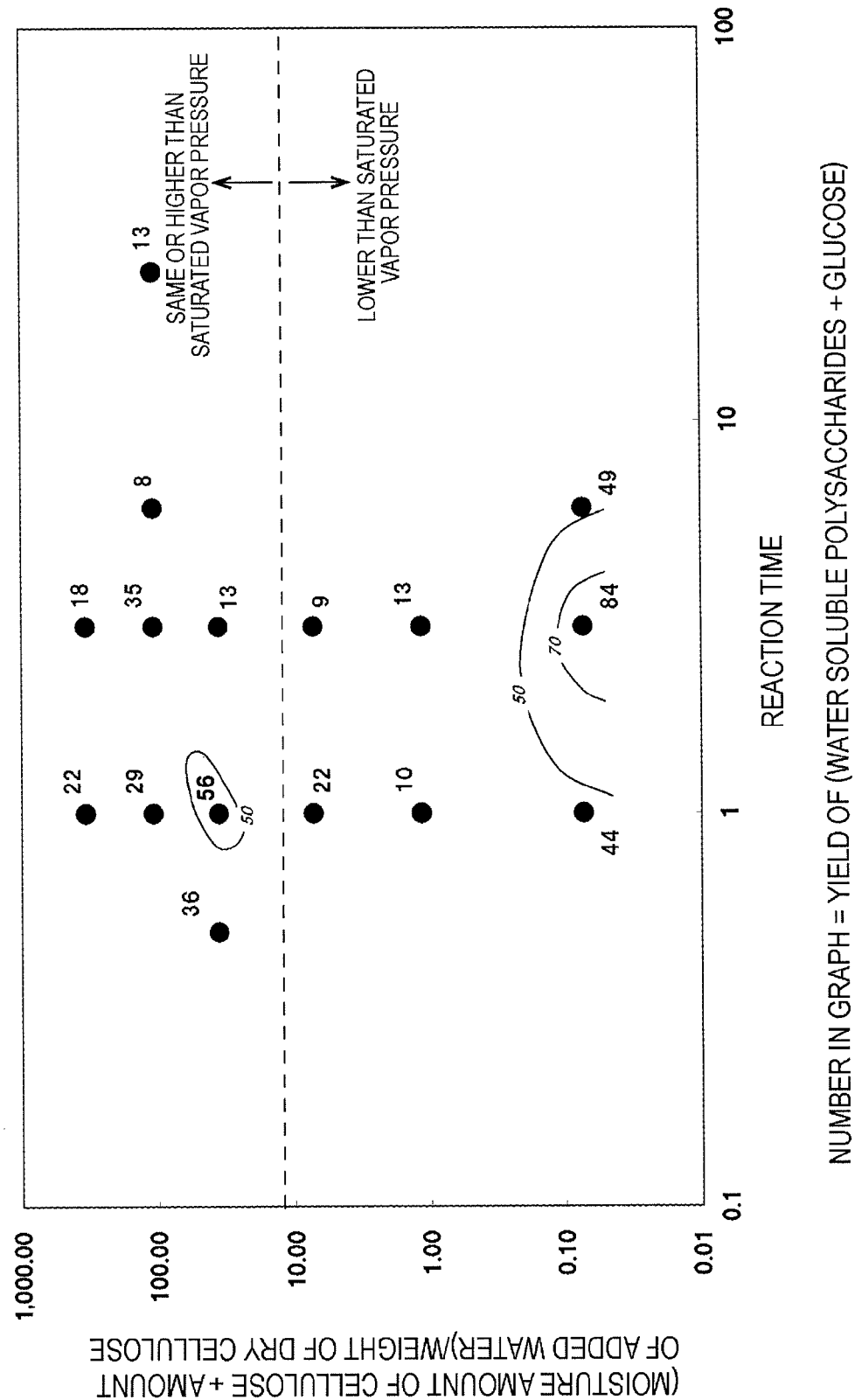
FIG. 4 is a graph of a plot of the yield of water soluble saccharides, in which the horizontal axis represents reaction time and the vertical axis represents moisture ratio.

Further, FIG. 4 is a graph of a plot of the yield of water soluble saccharides (i.e., total yield of water soluble polysaccharides and glucose), in which the horizontal axis represents reaction time and the vertical axis represents a moisture ratio (i.e., moisture content in reaction vessel/weight of dry cellulose). Further, the broken line in the graph indicates the line with a moisture ratio of 12 (i.e., value of moisture amount/weight of dry cellulose), and the saturated vapor pressure of 1.56 MPa is exactly obtained at that point. From the graph, it was found that the yield of water soluble saccharides has the maximum at two points, that is, a moisture ratio of near 0.1 and near 30.

Figure 5:
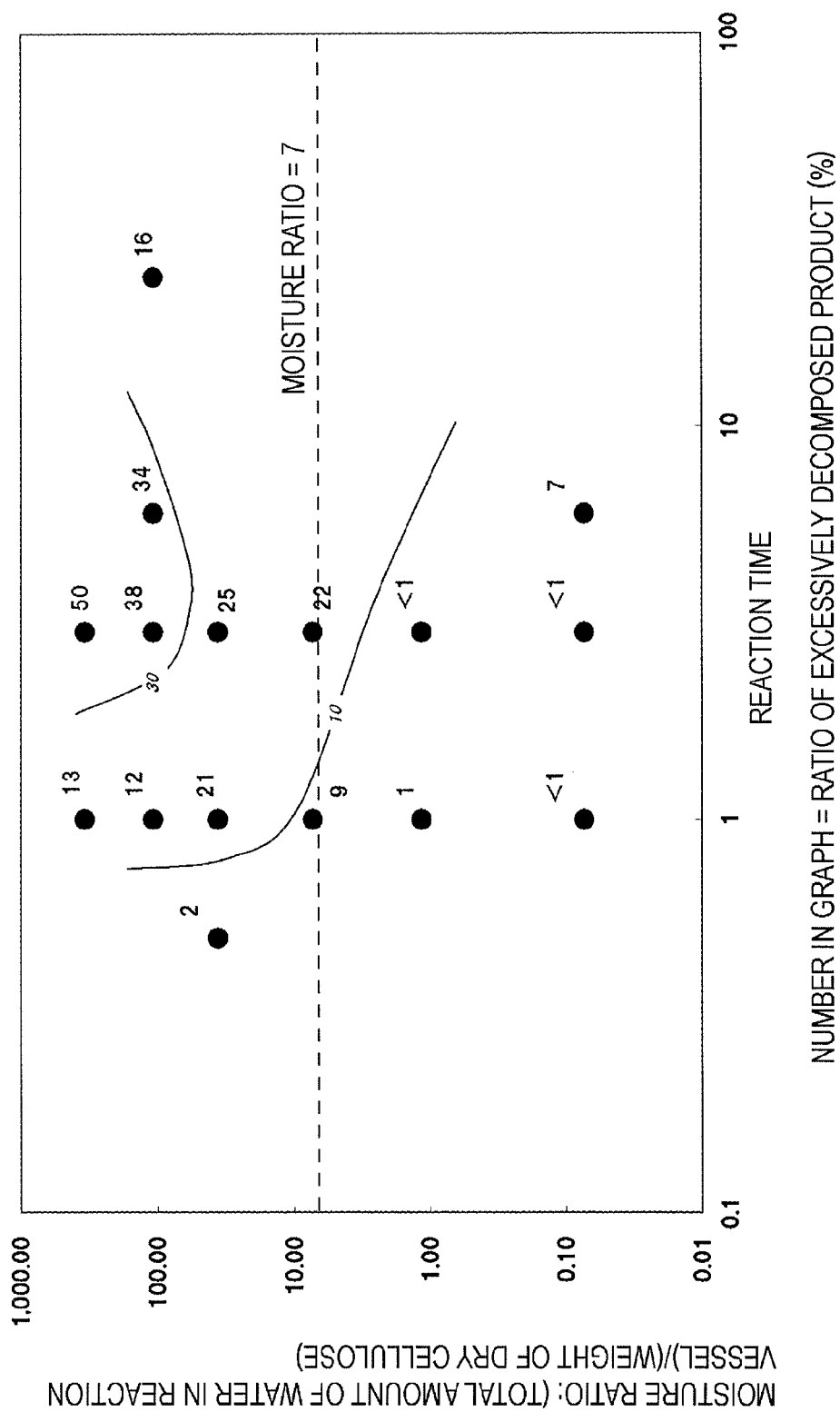
FIG. 5 is a graph illustrating the ratio of excessively decomposed product shown in percentage, in which the horizontal axis represents reaction time and the vertical axis represents moisture ratio.

Further, FIG. 5 is a graph illustrating the ratio of excessively decomposed product expressed in percentage, in which the horizontal axis represents reaction time and the vertical axis represents moisture ratio (i.e., moisture content in reaction vessel/weight of dry cellulose). From the graph, it was found that the excessive decomposition ratio increases as the moisture ratio (i.e., moisture content in reaction vessel/weight of dry cellulose) increases and it dramatically increases when the moisture ratio is 7 or higher.

<Confirmation of Crystallization Degree-Reducing Effect of Cellulose as Raw Material>

A difference in solubilization treatment was determined between a case of pulverizing cellulose raw material (a case of reducing crystallization degree) and a case of not pulverizing it.

Figure 6:
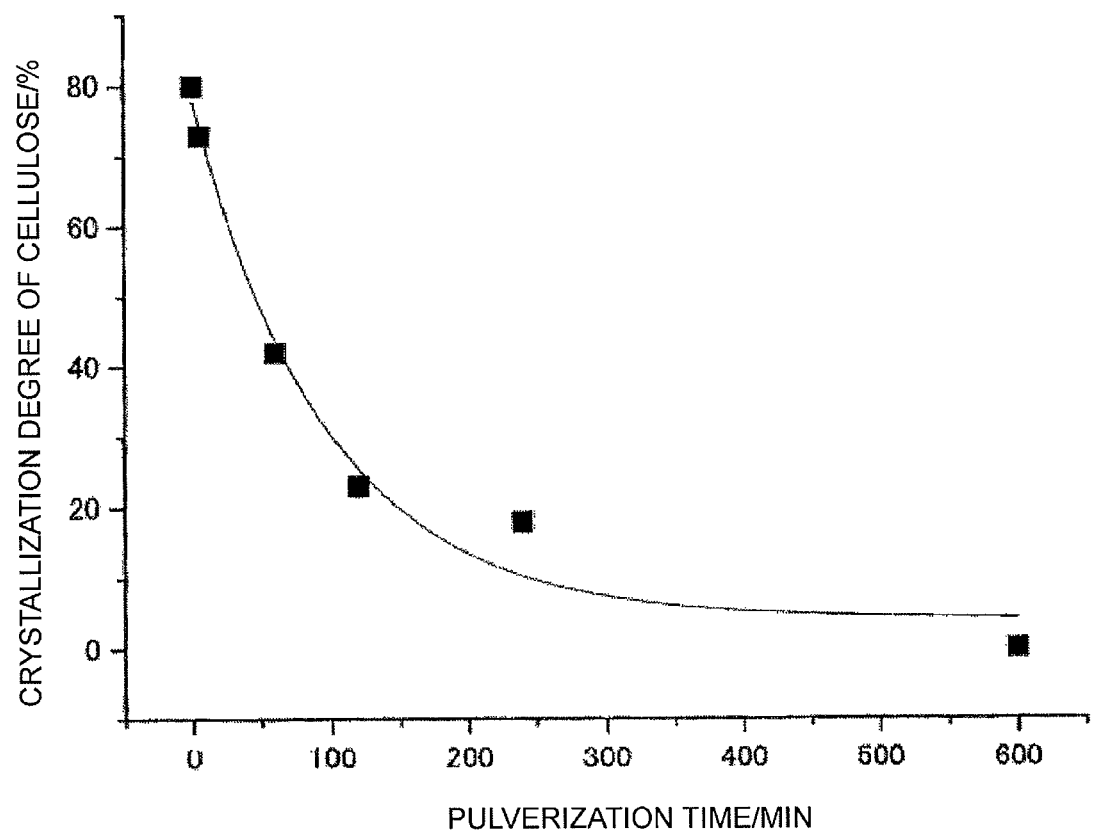
FIG. 6 is a graph illustrating the relation between the crystallization degree of cellulose and pulverization time.

For the pulverization process, cellulose as a chemical reagent (product name: Micro-Crystalline Cellulose, manufactured by Merck) was used and pulverized using a planetary ball mill (product name: Planetary Rotary Ball Mill, manufactured by Ito Seisakusho Co., Ltd., vessel for pulverization: zirconia pot, medium: $\phi 5$ zirconia ball, revolution number: 300 rpm). The pulverization time and crystallization degree of cellulose were measured. The results are shown in FIG. 6. Meanwhile, the crystallization degree was measured by Segal method based on an X ray diffraction measurement.

The cellulose raw material which has been treated above was subjected to a solubilization treatment with cellulose (containing water): 300 mg, water content ratio of cellulose: 5 to 7%, without addition of water, heating conditions: 200° C. for 3 hours, and then the content was extracted with water and filtered using a filter to obtain a water extract liquid. Thereafter, the solubilization ratio, ratio of glucose, ratio of excessively decomposed product, and ratio of polysaccharides with a low molecular weight were obtained by analysis based on high speed liquid chromatography and total organic carbon system (TOC system). The results are shown in Table 2.

TABLE 2

| | | | Product (liquid) | | | |
|---|---|---|---|---|---|---|
| No. | Time for ball mill pulverization | Crystallization degree % | Solubilization ratio % | Glucose % | Excessively decomposed product % | Other saccharides % |
| EQ11-052 Example 9 | No pulverization | 80 | 6.6 | 0.0 | 0.0 | 6.6 |
| Example 8-1 | 5 minutes | 73 | 11.5 | 0.3 | 0.4 | 10.8 |
| Example 8-2 | 1 hour | 42 | 38.9 | 0.5 | 0.3 | 38.1 |
| Example 8-3 | 2 hours | 23 | 60.6 | 0.9 | 0.4 | 59.3 |
| Example 8-4 | 4 hours | 18 | 68.0 | 1.0 | 0.7 | 66.2 |
| EQ11-052 Example 8 | 10 hours | 0 | 86.9 | 2.4 | 1.3 | 83.2 |

Figure 7:
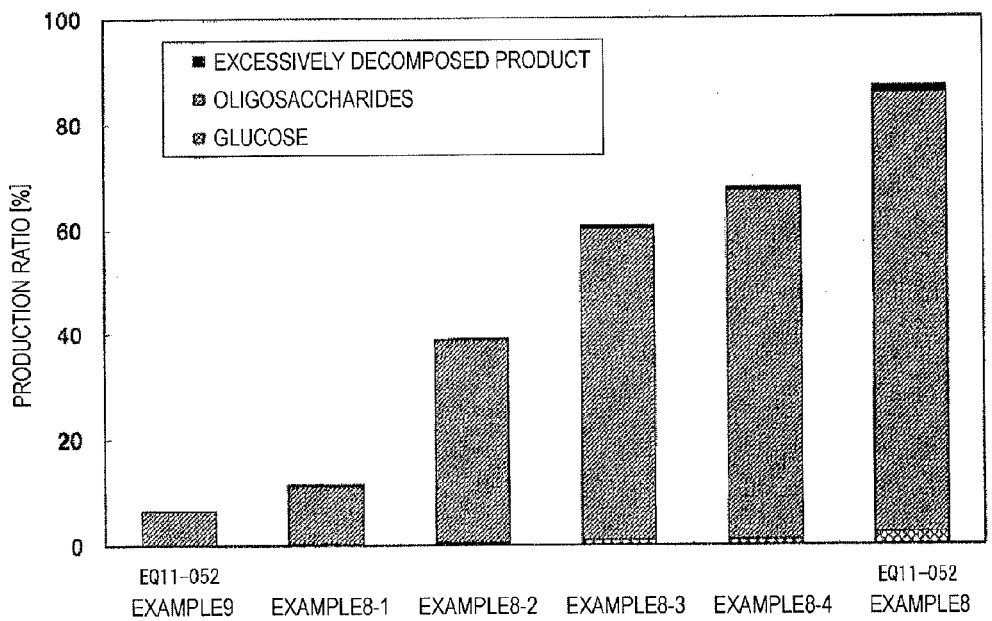
FIG. 7 is a bar graph illustrating the ratio of the product of Table 2.

In FIG. 7, the ratio of the products of Table 2 is shown as a bar graph. As shown in Table 2 and FIG. 7, Examples 8, 8-1, 2, 3, and 4 in which cellulose was subjected to a solubilization treatment after pulverization exhibited significantly higher solubilization ratio and the ratio of water soluble polysaccharides and had rapidly progressed hydrolysis reaction of cellulose than Example 9 having no pulverization.

Figure 8:
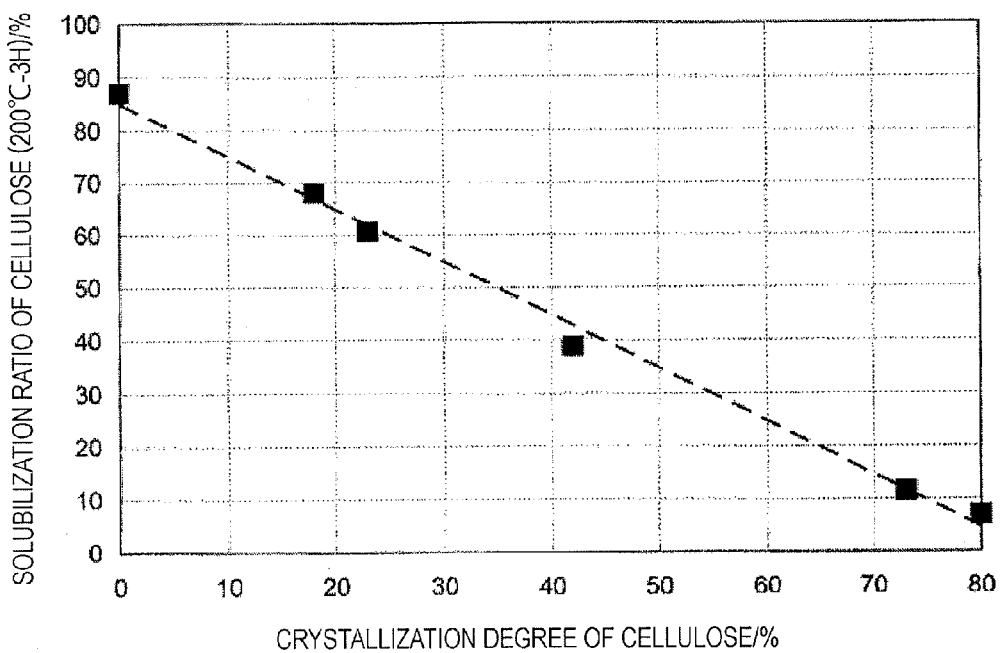
FIG. 8 is a graph illustrating the relation between the crystallization degree of cellulose and solubilization ratio in Table 2.

In FIG. 8, the relation between the crystallization degree and solubilization ratio of Table 2 is illustrated as a graph. From FIG. 8, it was found to be preferable to reduce as much as possible the crystallization degree of cellulose in advance.

The present invention is not limited at all to the examples of the embodiments of the present invention. The present invention also encompasses various modifications that are within the range in which a person skilled in the art can easily conceive but without departing from the descriptions of Claims.

The invention claimed is:

1. A method for extracting a water soluble component from cellulose, the method comprising:
   micro-pulverizing the cellulose to reduce a crystallization degree of the cellulose;
   hydrolyzing the cellulose under reaction conditions in which a catalyst is not present, at a temperature of 100° C. or higher and lower than 300° C., and a total pressure of 0.05 MPa or higher and lower than 10 MPa, the total pressure being lower than a saturated vapor pressure and the water entirely being in a gas state; and
   extracting the water soluble component from the hydrolyzed cellulose by adding water to the hydrolyzed cellulose.

2. The method according to claim 1, wherein the crystallization degree of the cellulose after micro-pulverization is 42% or less.

3. The method according to claim 2, wherein each of the cellulose and water is added in a pre-determined amount to a reaction vessel, and the temperature and pressure are adjusted by heating after sealing the reaction vessel.

4. The method according to claim 3, wherein a ratio of the water to the cellulose added to the reaction vessel (weight of water/weight of cellulose) is 0.01 or more and less than 7.

5. The method according to claim 4, wherein a value of (weight of water)/(weight of cellulose+weight of water) is 0.01 or more and less than 0.87 in the reaction vessel.

6. A method for extracting a water soluble component from a raw material containing cellulose, the method comprising:
   micro-pulverizing the raw material to reduce a crystallization degree of the cellulose in the raw material;
   hydrolyzing the cellulose in the raw material under reaction conditions in which a catalyst is not present, at a temperature of 100° C. or higher and lower than 300° C., and a total pressure of 0.05 MPa or higher and lower than 10 MPa, the total pressure being lower than a saturated vapor pressure and the water entirely being in a gas state; and
   extracting the water soluble component from the hydrolyzed cellulose by adding water to the hydrolyzed cellulose.

* * * * *